US008615573B1

(12) United States Patent
Walsh et al.

(10) Patent No.: US 8,615,573 B1
(45) Date of Patent: Dec. 24, 2013

(54) SYSTEM AND METHOD FOR NETWORKED PVR STORAGE AND CONTENT CAPTURE

(75) Inventors: Richard J. Walsh, Raleigh, NC (US); Alfredo C. Issa, Apex, NC (US); Sid Stafford, Durham, NC (US); James Evans, Apex, NC (US)

(73) Assignee: Quiro Holdings, Inc., Raleigh, NC (US)

( * ) Notice: Subject to any disclaimer, the term of this patent is extended or adjusted under 35 U.S.C. 154(b) by 1409 days.

(21) Appl. No.: 11/479,553

(22) Filed: Jun. 30, 2006

(51) Int. Cl.
*G06F 15/173* (2006.01)
*G06F 15/16* (2006.01)
*G06F 17/30* (2006.01)

(52) U.S. Cl.
USPC ........... 709/223; 707/777; 707/966; 709/201; 709/206; 709/219

(58) Field of Classification Search
USPC ................. 709/233, 201–211, 213–219, 223; 707/769–780, 964–972
See application file for complete search history.

(56) References Cited

U.S. PATENT DOCUMENTS

| | | | |
|---|---|---|---|
| 5,309,359 A | 5/1994 | Katz et al. |
| 5,404,295 A | 4/1995 | Katz et al. |
| 5,600,775 A | 2/1997 | King et al. |
| 5,625,833 A | 4/1997 | Levine et al. |
| 5,754,939 A | 5/1998 | Herz et al. |
| 5,887,120 A | 3/1999 | Wical |
| 6,006,241 A | 12/1999 | Purnaveja et al. |
| 6,094,653 A | 7/2000 | Li et al. |
| 6,167,441 A | 12/2000 | Himmel |
| 6,173,287 B1 | 1/2001 | Eberman et al. |
| 6,173,317 B1 | 1/2001 | Chaddha et al. |
| 6,182,808 B1 | 2/2001 | Walton et al. |
| 6,247,002 B1 | 6/2001 | Steels |
| 6,275,819 B1 | 8/2001 | Carter |
| 6,311,194 B1 | 10/2001 | Sheth et al. |
| 6,327,590 B1 | 12/2001 | Chidlovskii et al. |
| 6,332,144 B1 | 12/2001 | deVries et al. |
| 6,356,879 B2 | 3/2002 | Aggarwal et al. |
| 6,389,409 B1 | 5/2002 | Horovitz et al. |
| 6,453,315 B1 | 9/2002 | Weissman et al. |
| 6,457,010 B1 | 9/2002 | Eldering et al. |
| 6,460,034 B1 | 10/2002 | Wical |
| 6,463,433 B1 | 10/2002 | Baclawski |
| 6,498,795 B1 | 12/2002 | Zhang et al. |
| 6,546,405 B2 | 4/2003 | Gupta et al. |
| 6,553,367 B2 | 4/2003 | Horovitz et al. |

(Continued)

OTHER PUBLICATIONS

"Share It! —Content Transfer in Home-to-Home Networks"; Bostjan Marusic, Tomaz Finkst, Andraz Jere, Marko Meza, Stefan Dobravec, Jurij Tasic. University of Ljubljana, Faculty of Electrical Engineering, Trzaska 25, SI-1000 Ljubljana, Slovenia. IEEE MELECON 2004, May 12-15, 2004, Dubrovnik, Croatia. pp. 669-672.*

(Continued)

*Primary Examiner* — Ashok Patel
*Assistant Examiner* — Kevin Bechtel
(74) *Attorney, Agent, or Firm* — Withrow & Terranova, PLLC

(57) ABSTRACT

A content management system for managing content stored by a number of networked Personal Video Recorders (PVRs) associated with a user community is provided. More specifically, the storage space of each of the personal video recorders is physically or logically partitioned into a personal space and a community space. The content management system manages the community spaces of the PVRs such that content relevant to the user community is stored in the collective community space of the PVRs and available to the user community.

21 Claims, 7 Drawing Sheets

(56) References Cited

U.S. PATENT DOCUMENTS

| | | | |
|---|---|---|---|
| 6,560,578 B2 | 5/2003 | Eldering |
| 6,564,263 B1 | 5/2003 | Bergman et al. |
| 6,581,072 B1 | 6/2003 | Mathur et al. |
| 6,610,105 B1 | 8/2003 | Martin, Jr. et al. |
| 6,629,100 B2 | 9/2003 | Morris et al. |
| 6,675,159 B1 | 1/2004 | Lin et al. |
| 6,701,362 B1 | 3/2004 | Subramonian et al. |
| 6,725,259 B1 | 4/2004 | Bharar |
| 6,738,764 B2 | 5/2004 | Mao et al. |
| 6,744,922 B1 | 6/2004 | Walker |
| 6,772,160 B2 | 8/2004 | Cho et al. |
| 6,889,383 B1 | 5/2005 | Jarman |
| 6,898,799 B1 | 5/2005 | Jarman |
| 6,917,944 B1 | 7/2005 | Prasad et al. |
| 6,970,840 B1 | 11/2005 | Yu et al. |
| 7,028,024 B1 | 4/2006 | Kommers et al. |
| 7,054,900 B1 | 5/2006 | Goldston |
| 7,143,353 B2 | 11/2006 | McGee et al. |
| 7,150,030 B1 | 12/2006 | Eldering et al. |
| 7,302,429 B1 | 11/2007 | Wanker |
| 7,376,635 B1 | 5/2008 | Porcari et al. |
| 7,526,784 B2 | 4/2009 | Jarman |
| 7,596,549 B1 | 9/2009 | Issa et al. |
| 7,720,849 B2 | 5/2010 | Asano |
| 7,779,004 B1 | 8/2010 | Walsh et al. |
| 2002/0007371 A1 | 1/2002 | Bray |
| 2002/0059290 A1 | 5/2002 | Rising, III |
| 2002/0078090 A1 | 6/2002 | Hwang et al. |
| 2002/0112244 A1 | 8/2002 | Liou et al. |
| 2003/0050966 A1* | 3/2003 | Dutta et al. ............ 709/203 |
| 2003/0061028 A1 | 3/2003 | Dey et al. |
| 2003/0074400 A1 | 4/2003 | Brooks et al. |
| 2003/0093790 A1 | 5/2003 | Logan et al. |
| 2003/0095660 A1* | 5/2003 | Lee et al. ............ 380/231 |
| 2003/0110056 A1 | 6/2003 | Berghofer et al. |
| 2003/0120662 A1 | 6/2003 | Vishik |
| 2003/0135468 A1* | 7/2003 | Barbir et al. ............ 705/64 |
| 2003/0163597 A1 | 8/2003 | Hellman et al. |
| 2003/0179228 A1 | 9/2003 | Schreiber et al. |
| 2003/0191776 A1 | 10/2003 | Obrador |
| 2003/0191814 A1 | 10/2003 | Tran |
| 2003/0204605 A1 | 10/2003 | Hudson et al. |
| 2003/0226142 A1 | 12/2003 | Rand |
| 2003/0237085 A1 | 12/2003 | Boston et al. |
| 2004/0003413 A1* | 1/2004 | Boston et al. ............ 725/133 |
| 2004/0010483 A1 | 1/2004 | Brands et al. |
| 2004/0024720 A1 | 2/2004 | Fairweather |
| 2004/0024739 A1 | 2/2004 | Copperman et al. |
| 2004/0054672 A1 | 3/2004 | Tsuchitani et al. |
| 2004/0098754 A1 | 5/2004 | Vella et al. |
| 2004/0101272 A1* | 5/2004 | Boston et al. ............ 386/46 |
| 2004/0111465 A1 | 6/2004 | Chuang et al. |
| 2004/0111750 A1* | 6/2004 | Stuckman et al. ............ 725/89 |
| 2004/0117367 A1 | 6/2004 | Smith et al. |
| 2004/0154040 A1* | 8/2004 | Ellis ............ 725/58 |
| 2004/0170321 A1 | 9/2004 | Gong et al. |
| 2004/0220893 A1 | 11/2004 | Spivack et al. |
| 2004/0221311 A1 | 11/2004 | Dow et al. |
| 2005/0004930 A1 | 1/2005 | Hatta |
| 2005/0005300 A1* | 1/2005 | Putterman et al. ............ 725/89 |
| 2005/0034107 A1 | 2/2005 | Kendall et al. |
| 2005/0050578 A1 | 3/2005 | Ryal |
| 2005/0060743 A1* | 3/2005 | Ohnuma et al. ............ 725/39 |
| 2005/0076365 A1 | 4/2005 | Popov et al. |
| 2005/0086069 A1 | 4/2005 | Watson et al. |
| 2005/0091279 A1 | 4/2005 | Rising, III |
| 2005/0097451 A1 | 5/2005 | Cormack et al. |
| 2005/0120386 A1 | 6/2005 | Stone |
| 2005/0149510 A1 | 7/2005 | Shafrir |
| 2005/0154701 A1 | 7/2005 | Parunak et al. |
| 2005/0216443 A1 | 9/2005 | Morton et al. |
| 2005/0234958 A1 | 10/2005 | Sipusic et al. |
| 2005/0235336 A1 | 10/2005 | Ma |
| 2005/0262539 A1 | 11/2005 | Barton et al. |
| 2005/0289179 A1 | 12/2005 | Naphade et al. |
| 2006/0004683 A1 | 1/2006 | Talbot et al. |
| 2006/0004752 A1 | 1/2006 | Harel et al. |
| 2006/0031217 A1 | 2/2006 | Smith et al. |
| 2006/0047635 A1 | 3/2006 | Kraenzel et al. |
| 2006/0059260 A1* | 3/2006 | Kelly et al. ............ 709/225 |
| 2006/0064411 A1 | 3/2006 | Gross et al. |
| 2006/0236220 A1 | 10/2006 | Jarman |
| 2006/0242147 A1 | 10/2006 | Gehrking et al. |
| 2006/0282856 A1 | 12/2006 | Errico et al. |
| 2007/0106675 A1 | 5/2007 | Watanabe et al. |
| 2007/0154170 A1* | 7/2007 | Monroe ............ 386/83 |
| 2007/0244903 A1 | 10/2007 | Ratliff et al. |
| 2009/0083435 A1 | 3/2009 | Boulter et al. |

OTHER PUBLICATIONS

Welcome to Webbed Footnotes!, http://web.media.mitedu/~golder/projects/webbedfootnotes/.

Scott Carter et al., "Digital Graffiti: Public Annotation of Multimedia Content," Apr. 24-29, 2004.

Ronald Schroeter et al., "FilmEd—Collaborative Video Indexing, Annotation and Discussion Tools Over Broadband Networks."

Johan Pouwelse et al., "P2P-based PVR Recommendation using Friends, Taste Buddies and Superpeers", Beyond Personalization 2005, Workshop on the Next Stage of Recommender Systems Research, San Diego, USA, Jan. 2005.

Information Technology—Multimedia Content Description Interface—Part 6: Reference Software, http://www.iso.ch/iso/en/CatalogueDetailPage.CatalogueDetail?CSNUMBER=35364&printable=true.

W3C OWL Web Ontology Language Overview, http://www.w3.org/TR/owl-features/.

Alexander Pretschner et al., "Ontology Based Personalized Search," (article), Nov. 8-10, 1999, p. 391, Proceedings of the 11th IEEE International Conference on Tools with Artificial Intelligence.

T. Srinivasan et al., "OPSHNN: Ontology Based Personalized Searching Using Hierarchical Neural Networks Evidence Combination," (article), Sep. 2006, pp. 44-44, The Sixth IEEE International Conference on Computer and Information Technology 2006.

Belle T. Tseng et al., "Using MPEG-7 and MPEG-21 for Personalizing Video," (article), Jan.-Mar. 2004, pp. 45-52, IEEE Multimedia.

Xingquan Zhu et al., "Hierarchical video content description and summarization using unified semantic and visual similarity," (article), Jul. 2003, pp. 31-53, Multimedia Systems 9(1).

Wallapak Tavapong, "Shot Clustering Techniques for Story Browsing," (article), Aug. 2004, pp. 517-527, vol. 6, No. 4, IEEE Transactions on Multimedia.

Breen, Casey, et al., "Image Classification Using Neural Networks and Ontologies," (article), Sep. 2-6, 2002, pp. 98-102, IEEE Computer Society, Proceedings of the 13th International Workshop on Database and Expert Systems Applications.

* cited by examiner

US 8,615,573 B1

SYSTEM AND METHOD FOR NETWORKED PVR STORAGE AND CONTENT CAPTURE

FIELD OF THE INVENTION

The present invention relates to personal video recorders (PVRs) and more specifically relates to networked PVRs for sharing recorded content and a content management system for managing the content stored thereon.

BACKGROUND OF THE INVENTION

Personal Video Recorders (PVRs) such as TiVo® PVRs have gained tremendous popularity among consumers. PVRs enable users to record television content for playback at a later time. In addition, some PVRs, such as the TiVo® Series 2 PVR, enable sharing of recorded content between multiple devices in a user's home and provide automatic recording of content based on user preferences such as preferred actors or keywords. However, traditional PVRs do not enable multiple users to pool their PVR resources to provide a community of networked PVRs where content collectively stored by the PVRs is managed by a central system.

SUMMARY OF THE INVENTION

The present invention provides a content management system for managing content stored by a number of networked personal video recorders (PVRs) associated with a user community. More specifically, the storage space of each of the personal video recorders is physically or logically partitioned into a personal space and a community space. Combined, the community spaces of the PVRs form a collective community space. The content management system manages the collective community space such that content relevant to the user community is stored in the collective community space. The content stored in the collective community space is made available to each of the users in the user community.

In one embodiment, a master content agent receives user interest events from the PVRs and, optionally, associated playback devices. Based on the user interest events, the master content agent generates a user interest model for the community. In addition, the master content agent may analyze content already stored in the collective community space to generate a community content model. Thereafter, when new content is available, the master content agent compares the new content to the user interest model, the community content model, or both the user interest model and the community content model to determine whether the new content should be added to the collective community space. If so, the master content agent effects the addition of the new content to the collective community space. When desired, users at the PVRs or at the associated playback devices may obtain the new content from the collective community space for playback.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
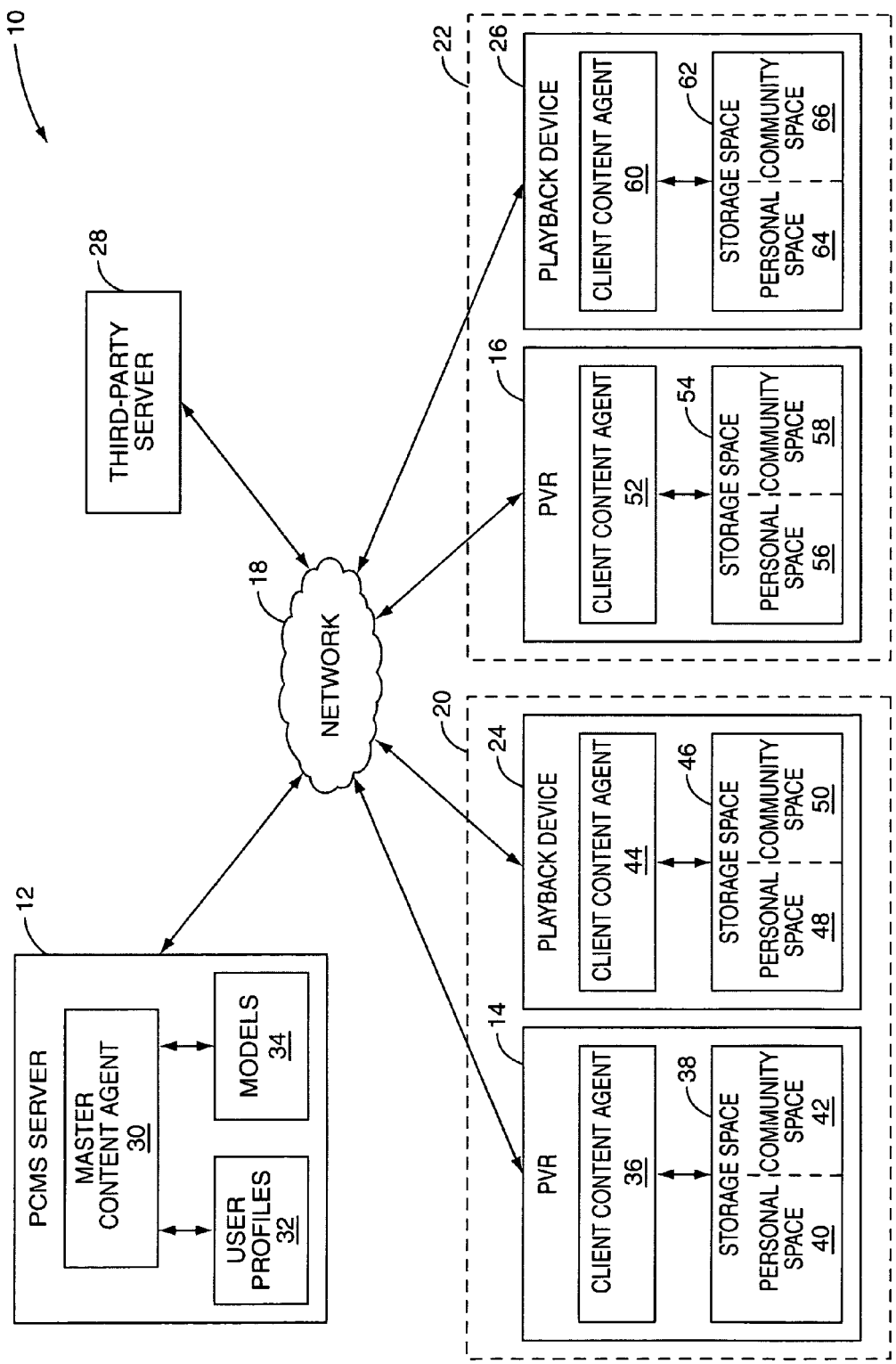
FIG. 1 illustrates a Personal Video Recorder (PVR) Content Management System (PCMS) according to one embodiment of the present invention.

FIG. 1 illustrates a Personal Video Recorder (PVR) Content Management System (PCMS) 10 according to one embodiment of the present invention. The system 10 includes a central PCMS server 12 communicatively coupled to a number of PVRs 14, 16 via a network 18, which may be a Wide Area Network (WAN) such as, but not limited to, the Internet, a Local Area Network (LAN), or a combination thereof. The PVRs 14, 16 may be located at user locations 20, 22, respectively. The user locations 20, 22 may be, for example, the homes of associated users. In addition, the system 10 may optionally include additional playback devices 24, 26, where the playback devices 24, 26 are also communicatively coupled to the PCMS server 12 via the network 18. In this embodiment, the playback devices 24, 26 are located at the user locations 20, 22, respectively; however, the present invention is not limited thereto. In addition, although not illustrated, the system 10 may include user devices dedicating resources, such as storage space, to the community where the user devices may or may not have playback capabilities. The system 10 may also include a third-party server 28, which may inject content into the system 10, as discussed below in more detail.

The PCMS server 12 includes a master content agent 30, user profiles 32, and one or more models 34. The master content agent 30 may be implemented in software, hardware, or a combination of hardware and software. The master content agent 30 may perform all associated processing tasks or, optionally, offload certain processing tasks to client content agents of the PVRs 14, 16 and the playback devices 24, 26.

Alternatively, the master content agent 30 may be implemented in a distributed fashion as a plurality of master content agents incorporated into the PVRs 14, 16 and the playback devices 24, 26.

In general, the master content agent 30 operates to manage the content stored in community spaces of the PVRs 14, 16 and, optionally, community spaces of the playback devices 24, 26 such that content relevant to the community of users is recorded and stored in the collective community space provided by the PVRs 14, 16 and, optionally, the playback devices 24, 26.

The user profiles 32 include profiles of the users of the PVRs 14, 16 and associated playback devices 24, 26 in the system 10. The user profiles 32 may be stored in a digital storage device such as, but not limited to, a hard-disc drive associated with or within the PCMS server 12. While the user profiles 32 are illustrated as being included within the PCMS server 12, the user profiles may alternatively be stored in one or more storage devices associated with the PCMS server 12, stored by one or more third-party servers, or the like. For each user, the user's profile may include information such as, but not limited to, information identifying content stored in a personal space of the user's PVR; information identifying content stored in the community space of the user's PVR; information identifying a storage capacity of the user's PVR and the portion of the storage capacity allocated to the user's personal and community spaces; information identifying the amount of available storage space in the community space on the user's PVR; information identifying the recording features of the user's PVR such as whether the user's PVR records in high-definition, standard-definition, or both high-definition and standard-definition; information identifying television channels accessible to the user's PVR; information identifying other media content accessible to the user's PVR such as media content available via a Video-On-Demand (VOD) service or available via the network 18; information identifying content scheduled to be recorded by the user's PVR; information identifying content watched by the user but not recorded by the user's PVR; information identifying actions taken by the user while watching particular content; information identifying how long the user watches particular content; and the like.

If the user has one or more associated playback devices, for each of the playback devices, the user's profile may further include information identifying content stored in a personal space of the user's playback device; information identifying content stored in the community space of the user's playback device; information identifying other media content accessible to the playback device such as media content available via the network 18; information identifying a storage capacity of the user's playback device and the portion of the storage capacity allocated to the user's personal and community spaces; information identifying the amount of available storage space in the community space on the user's playback device; information identifying content watched by the user; information identifying actions taken by the user while watching particular content; information identifying how long the user watches particular content; and the like. The information in the user's profile may be provided to the PCMS 12 automatically or upon request.

Generally, the models 34 are stored within or in association with the PCMS server 12. While the user profiles 32 are illustrated as being included within the PCMS server 12, the user profiles may alternatively be stored in one or more storage devices associated with the PCMS server 12, stored by one or more third-party servers, or the like. As discussed below, the models 34 are generated by the master content agent 30 based on the user profiles 32 and may include a community content model semantically describing the content stored in the collective community spaces of the PVRs 14, 16 and the playback devices 24, 26, a user interest model semantically describing the interests of the users of the PVRs 14, 16 and the associated playback devices 24, 26, and a device capabilities model defining the capabilities of the PVRs 14, 16 and the playback devices 24, 26. The models 34 are then used by the master content agent 30 to determine whether content made available by the PVRs 14, 16 or desired to be injected into the collective community space is to be added to the collective community space of the PVRs 14, 16 and playback devices 24, 26.

The user location 20 may be a home, business, or the like associated with the user of the PVR 14 and optionally the playback device 24. While only one playback device 24 is illustrated, the user may contribute the storage space from any number of playback devices to the community. In addition, resources from other user devices that may or may not have playback capabilities may be dedicated to the community. Further, while the discussion herein focuses on the situation where the PVR 14 and the playback device 24 are at the same user location 20, the present invention is not limited thereto.

The PVR 14 may be a set-top box similar to the TiVo® PVRs, a PVR function implemented in a set-top box or a personal computer, or the like. The PVR 14 includes a client content agent 36 and a storage space 38, which is logically or physically partitioned into a personal space 40 and a community space 42. The storage space 38 may be formed by one or more digital storage units or devices such as, but not limited to, one or more hard-disc drives, one or more optical disc drives, one or more associated network drives, or the like.

The client content agent 36 may be implemented in software, hardware, or a combination of software and hardware. The client content agent 36 interacts with the master content agent 30 to provide information such as, but not limited to, information identifying content stored in the personal space 40 of the PVR 14; information identifying content stored in the community space 42 of the PVR 14; information identifying a storage capacity of the storage space 38 and the portion of the storage capacity allocated to the personal space 40 and the community space 42; information identifying the amount of available storage space in the community space 42; information identifying recording features of the PVR 14 such as whether the PVR 14 records in high-definition, standard-definition, or both high-definition and standard-definition; information identifying television channels accessible to the PVR 14; information identifying other media content accessible to the user's PVR such as media content available via a Video-On-Demand (VOD) service or available via the network 18; information identifying content scheduled to be recorded by the PVR 14; information identifying content watched by the user but not recorded by the PVR 14; information identifying actions taken by the user while watching particular content; information identifying how long the user watches particular content; and the like. The client content agent 36 may provide such information to the master content agent 30 automatically or upon request.

In response to instructions from the master content agent 30, the client content agent 36 may also operate to move content from the personal space 40 to the community space 42; record specified content and store the content in the community space 42; generate a new version of content such as, for example, a standard-definition version of high-definition content; remove specified content from the community space 42; copy specified content from the personal space 40 or the community space 42 to the community space of another PVR, such as the PVR 16, to the community space of the playback device 24, or the community space of another user's playback device, such as the playback device 26. Note that if the PVR 14 has various recording capabilities, the master content agent 30 may instruct the client content agent 36 to record content using desired configurations. For example, if the PVR 14 can record in both high-definition and standard-definition but a majority of the other PVRs 14, 16 and playback devices 24, 26 can play only standard-definition content, the master content agent 30 may instruct the PVR 14 to record in standard-definition.

When content is copied to another device, the content may be transferred directly to the other device via a direct peer-to-peer (P2P) connection over the network 18 or via a proxy, which may be, for example, the PCMS server 12. Further, if transferring to a device within the same local area network (LAN), the content may be transferred via a direct P2P connection over the LAN.

The playback device 24 may be any device having media playback capabilities such as, for example, a personal computer, a mobile device having media playback capabilities, or the like. The playback device 24 includes a client content agent 44 and storage space 46, which may be logically or physically partitioned into a personal space 48 and a community space 50. The storage space 46 may be formed by one or more digital storage units or devices such as, but not limited to, one or more hard-disc drives, one or more optical disc drives, one or more associated network drives, or the like.

The client content agent 44 may be implemented in software, hardware, or a combination of software and hardware. The client content agent 44 interacts with the master content agent 30 to provide information such as, but not limited to, information identifying content stored in the personal space 48 of the playback device 24; information identifying content stored in the community space 50 of the playback device 24; information identifying other media content accessible to the playback device 24 such as media content available via the network 18; information identifying a storage capacity of the storage space 46 and the portion of the storage capacity allocated to the personal space 48 and the community space 50; information identifying the amount of available storage space in the community space 50; information identifying content watched by the user; information identifying actions taken by the user while watching particular content; information identifying how long the user watches particular content; and the like. The client content agent 44 may provide such information to the master content agent 30 automatically or upon request.

In response to instructions from the master content agent 30, the client content agent 44 may also operate to generate a new version of content such as, for example, a standard-definition version of high-definition content; remove specified content from the community space 50; copy specified content from the community space 50 to the community space of a PVR such as the PVR 16 or the community space of another user's playback device such as the playback device 26. When content is copied to another device, the content may be transferred directly to the other device via a direct P2P connection over the network 18 or via a proxy, which may be, for example, the PCMS server 12. Further, if transferring to a device within the same local area network (LAN), the content may be transferred via a direct P2P connection over the LAN.

As with the user location 20, the user location 22 may be a home, business, or the like associated with the user of the PVR 16 and, optionally, the playback device 26. While only one playback device 26 is illustrated, the user may contribute the storage space from any number of playback devices to the community. In addition, while the discussion herein focuses on the situation where the PVR 16 and the playback device 26 are at the same user location 22, the present invention is not limited thereto.

Like the PVR 14, the PVR 16 includes a client content agent 52 and a storage space 54, which is logically or physically partitioned into a personal space 56 and a community space 58. The discussion above with respect to the client content agent 36 and the storage space 38 is equally applicable to the client content agent 52 and the storage space 54. As such, the details of the PVR 16 are not repeated.

Like the playback device 24, the playback device 26 may be, for example, a personal computer or the like having media playback capabilities. The playback device 26 includes a client content agent 60 and storage space 62, which may be logically or physically partitioned into a personal space 64 and a community space 66. The discussion above with respect to the client content agent 44 and the storage space 46 of the playback device 24 is equally applicable to the client content agent 60 and the storage space 62 of the playback device 26. As such, the details of the playback device 26 are not repeated.

In operation, the master content agent 30 analyzes the content stored in the community spaces 42, 58 of the PVRs 14, 16 and the content in the community spaces 50, 66 of the playback devices 24, 26 to generate a community content model semantically describing the content stored in the collective community space provided by the PVRs 14, 16 and the playback devices 24, 26. In addition, or alternatively, the master content agent 30 analyzes information provided by the client content agents 36, 44, 52, and 60 to generate a user interest model of the associated users in the community. The information analyzed to generate the user interest model may include information such as information identifying content scheduled to be recorded by the PVRs 14, 16; information identifying content watched by the users of the PVRs 14, 16 but not recorded by the PVRs 14, 16; information identifying content watched by the users of the playback devices 24, 26; information identifying actions taken by the users while watching particular content on the PVRs 14, 16 and the playback devices 24, 26; information identifying how long the user watched particular content, and the like.

Thereafter, when, for example, the PVR 14 records content, the client content agent 36 obtains information identifying and describing the recorded content, which is hereafter referred to as metadata, and provides the metadata to the master content agent 30. The master content agent 30 compares the metadata for the recorded content to the community content model, the user interest model, or both the community content model and the user interest model to determine whether the recorded content is to be added to the collective community space of the PVRs 14, 16 and the playback devices 24, 26. If so, the recorded content is moved to the community space 42 of the PVR 14. Alternatively, the recorded content may be moved from the personal space 40 of the PVR 14 to the community space of another PVR 16 or one of the playback devices 24, 26. Optionally, the master content agent 30 may also operate to copy the recorded content from the PVR 14 to the community space of one or more additional PVRs, such as the PVR 16, or the playback devices 24, 26 such that the recorded content is readily available to the other users in the community.

When a user such as the user at the playback device 26 desires to view the recorded content, the master content agent 30 may operate as a proxy to obtain the recorded content from the PVR 14 or another device storing a copy of the recorded content and provide the recorded content to the playback device 26. Rather than operating as a proxy, the master content agent 30 may direct the playback device 26 to obtain the recorded content from the PVR 14 or another device storing a copy of the recorded content over a direct P2P connection or via a separate proxy server. In either case, the playback device 26 may then store a copy of the recorded content and serve subsequent requests. Alternatively, the recorded content may be streamed to the playback device 26 such that the recorded content is not permanently stored on the playback device 26.

In a similar fashion, the master content agent 30 may receive idle events from the PVRs 14, 16. The PVRs 14, 16 may provide idle events when they are idle or when, based on history, the PVRs 14, 16 are not idle and expect to be idle for a threshold period of time. When the master content agent 30 receives an idle event from, for example, the PVR 14, the master content agent 30 may obtain metadata describing content available to the PVR 14. More specifically, the master content agent 30 is aware of the television channels accessible by the PVR 14. In addition, the master content agent 30 may obtain metadata for content that may be recorded from the channels accessible to the PVR 14 from the client content agent 36 where the client content agent 36 may obtain the metadata from an Electronic Programming Guide (EPG), from an external source such as a server associated with the television service provider associated with the PVR 14, or from a database stored by or in association with the PCMS server 12.

Once the metadata for the available content is obtained, the master content agent 30 compares the metadata for the available content to the community content model, the user interest model, or both the community content model and the user interest model to identify content to be recorded by the PVR 14, if any. The master content agent 30 interacts with the client content agent 36 to instruct the PVR 14 to record the identified content in the community space 42 of the PVR 14. Once recorded, the master content agent 30 may also operate to copy the recorded content from the PVR 14 to the community space of one or more additional PVRs 16 or playback devices 24, 26 such that the recorded content is readily available to the other users in the community. Thereafter, the recorded media content may be served to the PVRs or playback devices of other users in the community from the PVR 14 or any other device to which the content has been copied upon request.

In a similar fashion, the third-party server 28, which may be associated with a content provider such as a television or movie content provider, may provide metadata describing content that may be injected into the collective community space of the PVRs 14, 16 and the playback devices 24, 26 by the third-party server 28. The master content agent 30 compares the metadata for the content to the community content model, the user interest model, or both the community content model and the user interest model to determine whether the content is to be added to the collective community space of the PVRs 14, 16 and the playback devices 24, 26. If so, the master content agent 30 identifies one or more of the PVRs 14, 16 and playback devices 24, 26 to which the content is to be copied. Once identified, the master content agent 30 instructs the third-party server 28 to transfer the content to the identified devices either directly or through a proxy, such as the PCMS server 12. The content is then stored in the community spaces of the identified devices and made available to the community.

Figure 2:
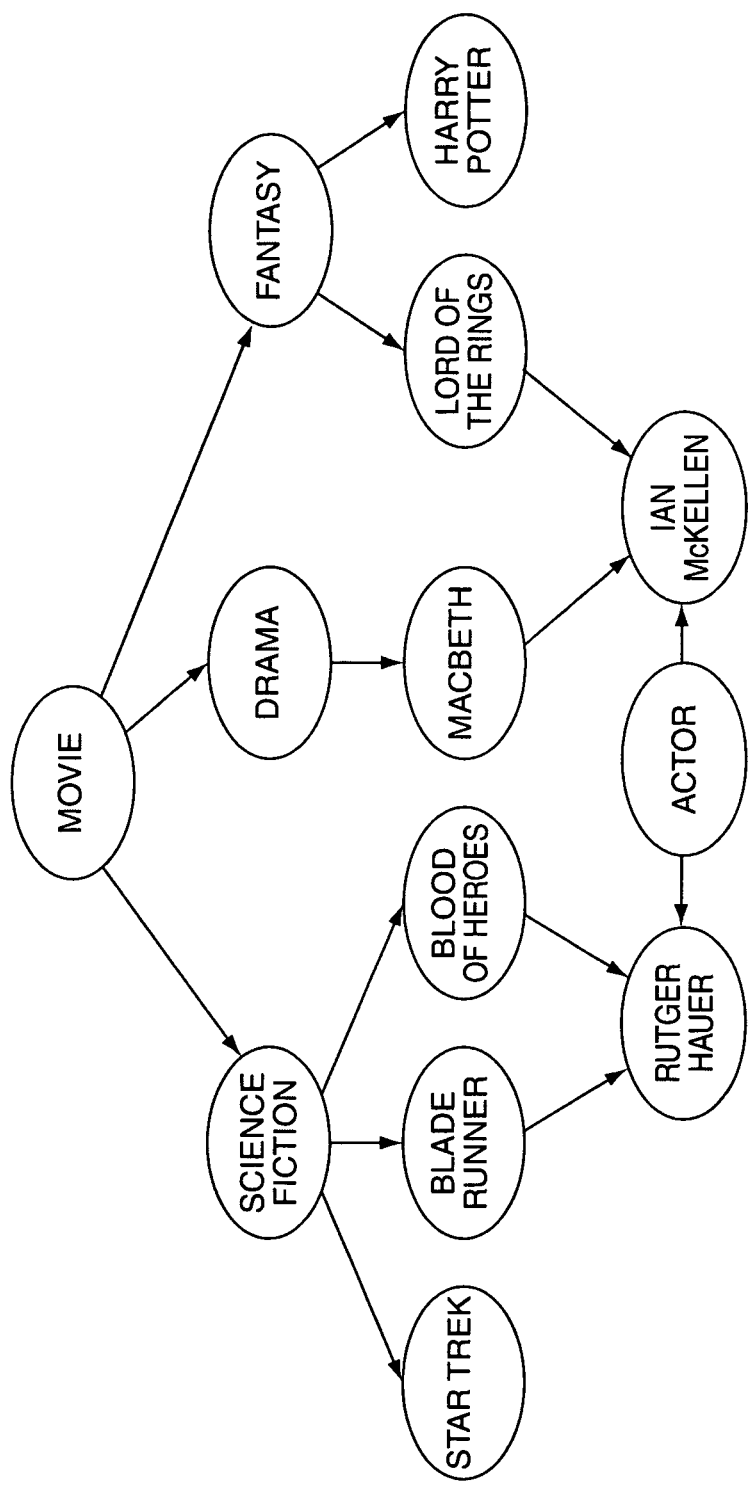
FIG. 2 illustrates an exemplary content ontology used to generate a user interest model and a community content model according to one embodiment of the present invention.

FIG. 2 illustrates an exemplary content ontology, or a portion of an exemplary content ontology, that may be used by the master content agent 30 to generate the community content model and the user interest model. The content ontology may be expressed using, for example, the World Wide Web Consortium's (WC3's) OWL Web Ontology Language, Defense Advanced Research Projects Agency (DARPA) Agent Markup Language+Ontology Interchange Language (DAML+OIL), Resource Description Framework (RDF), or the like. It should be noted that while the discussion below focuses on generating the user interest model, the community content model, and the device capabilities model based on ontologies, the present invention is not limited thereto. Other types of models will be apparent to one of ordinary skill in the art upon reading this disclosure.

Figure 3:
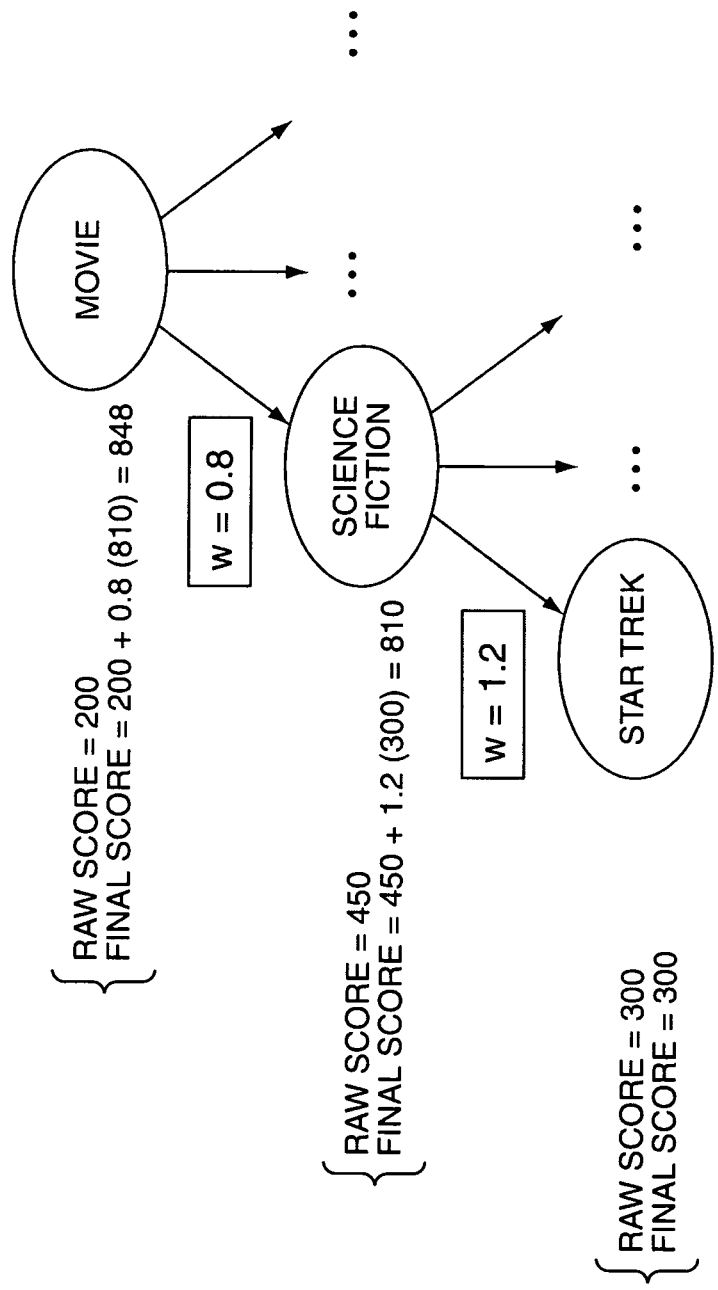
FIG. 3 illustrates a portion of the exemplary content ontology and a method of scoring the nodes of the content ontology based on information describing particular content according to one embodiment of the present invention.

Before discussing the generation of the community content model and the user interest model in more detail, it may be beneficial to discuss how nodes of the content ontology are scored based on specific content. Referring to FIG. 3, specific content, such as a movie, may be scored as follows. Each node in the content ontology is associated with a number of predicates, or rules. For example, the "Science Fiction" node may include a number of science fiction predicates indicating that content playing on the "Sci-Fi" television channel or content having metadata otherwise indicting that the content is of the "Sci-Fi" genre are associated with the "Science Fiction" node. By comparing the metadata for the content to the predicates of each of the nodes, the nodes of the content ontology are scored. The raw score for each node may, for example, be defined by the scoring algorithm as:

$$raw\_score=node\_level*number\_of\_hits,$$

where "node_level" is the level of the node in the content ontology. For example, the "Movie" node is a level 1 node, the "Science Fiction" node is a level 2 node, and the "Star Trek" node is a level 3 node. The term "number_of_hits" is the number of times the metadata of the content satisfies any of the predicates of the node.

In the example of FIG. 3, there are 200 hits on the predicates of the "Movie" node for the content to be scored. As such, the raw score for the "Movie" node is 200 (1×200). As for the "Science Fiction" node, there are 225 hits such that the raw score for this node is 450 (2×225). As for the "Star Trek" node, there are 100 hits such that that raw score for this node is 300 (3×100). Optionally, the raw score of each parent node may be combined with the raw scores of its child nodes to provide final scores for the nodes. The parent and child nodes may be related using a weighting scheme. In this example, the "Star Trek" node has no scored child nodes. As such, the final score for the "Star Trek" node is 300. The "Star Trek" node is a child node of the "Science Fiction" node. Assuming that the "Science Fiction" node has no other scored child nodes, the final score of the "Science Fiction" node is its raw score plus the weighted raw score of the "Star Trek" node. In this example, the weight of the relationship between the "Science Fiction" node and the "Star Trek" node is 1.2. Thus, the final score of the "Science Fiction" node is 810 (450+1.2×300). In a similar fashion, the final score of the "Movie" node is 848 (200+0.8×810).

For additional details of scoring nodes in an ontology, the interested reader is direct to U.S. patent application Ser. No. 11/359,632, entitled "Methods, Systems, and Products for Characterizing Target Systems," filed Feb. 22, 2006 and U.S. patent application Ser. No. 11/414,021, entitled "Methods, Systems, and Products for Classifying Content Segments," filed Apr. 28, 2006, both of which are hereby incorporated herein by reference in their entireties.

Figure 4:
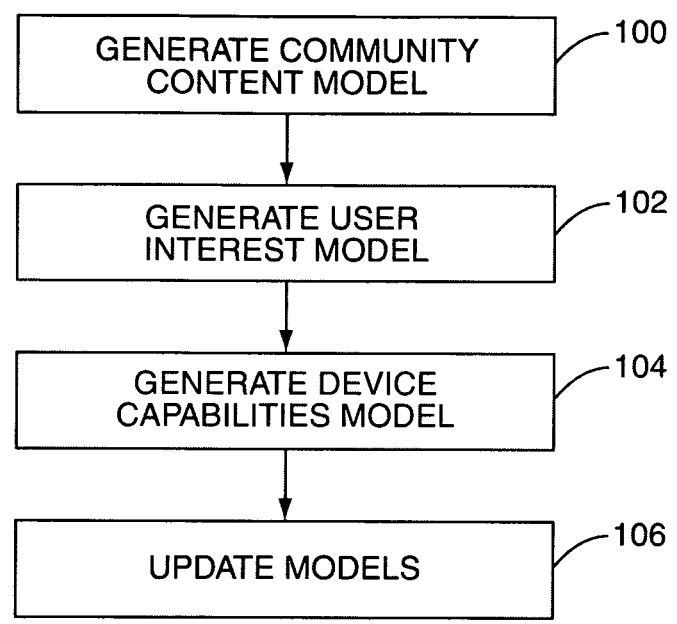
FIG. 4 is a flow chart illustrating the operation of the master content agent to generate the user interest model, the community content model, and the device capabilities model according to one embodiment of the present invention.

FIG. 4 is a flow chart illustrating the operation of the master content agent 30 to generate the community content model, the user interest model, and the device capabilities model according to one embodiment of the present invention. The master content agent 30 generates the community content model by scoring the nodes of the content ontology for all of the media content stored in the collective community space of the PVRs 14, 16 and the playback devices 24, 26 (step 100). More specifically, the master content agent 30 scores the nodes of the content ontology for each television program, movie, or the like recorded and stored in the collective community space. Each television program, movie, or the like may generally be referred to as a media content unit. For each node in the content ontology, the scores from each of the television programs, movies, and the like are combined to provide a combined score for the node. Together, the combined scores for the nodes in the content ontology form the community content model. Note that the scores associated with the content stored in the community spaces of devices associated with preferred users may be given additional weight. A preferred user may be a user having dedicated a large amount of resources to the community, one of the users having dedicated at least a threshold amount of resources, a user having paid a fee for the preferred status, or the like.

In a similar fashion, the master content agent 30 generates the user interest model by scoring the nodes on the content ontology for various user interest events received from the PVRs 14, 16 and the playback devices 24, 26 (step 102). As discussed above, the client content agents 36, 44, 52, and 60 may provide information to the master content agent 30 related to various user interest events such as scheduled recordings, content watched but not recorded, actions taken by the user while watching content, the length of time the users watch certain content, and the like. Each of the user interest events, and optionally metadata describing the content associated with the user interest event, are used to score the nodes in the content ontology. For each node, the scores for all of the user interest events are combined to provide a combined user interest score for that node. Together, the combined user interest scores for all of the nodes in the content ontology form the user interest model. Again, note that the scores associated with content stored in the community spaces of devices associated with preferred users may be given additional weight.

In one embodiment, the master content agent 30 generates the device capabilities model by scoring a separate device capabilities ontology using the device capabilities of the PVRs 14, 16 and playback devices 24, 26 (step 104). More specifically, in a manner similar to that described above with respect to the community content model and the user interest model, the master content agent 30 may score the nodes of the device capabilities ontology for each of the PVRs 14, 16 and each of the playback devices 24, 26. For each node, the scores for all of the PVRs 14, 16 and playback devices 24, 26 are combined to provide a combined device capability score for that node. Together, the combined device capability scores for all of the nodes in the device capabilities ontology form the device capabilities model.

The master content agent 30 may then operate to update the community content model, the user interest model, and the device capabilities model (step 106). The community content model may be updated as new content is added to the collective community space, as content is removed from the collective community space, or when the content in the collective community space otherwise changes. The user interest model may be updated in response to receiving new user interest events. The device capabilities model may be updated if new devices are added to the community or if the device capabilities of the devices in the community change.

Figure 5:
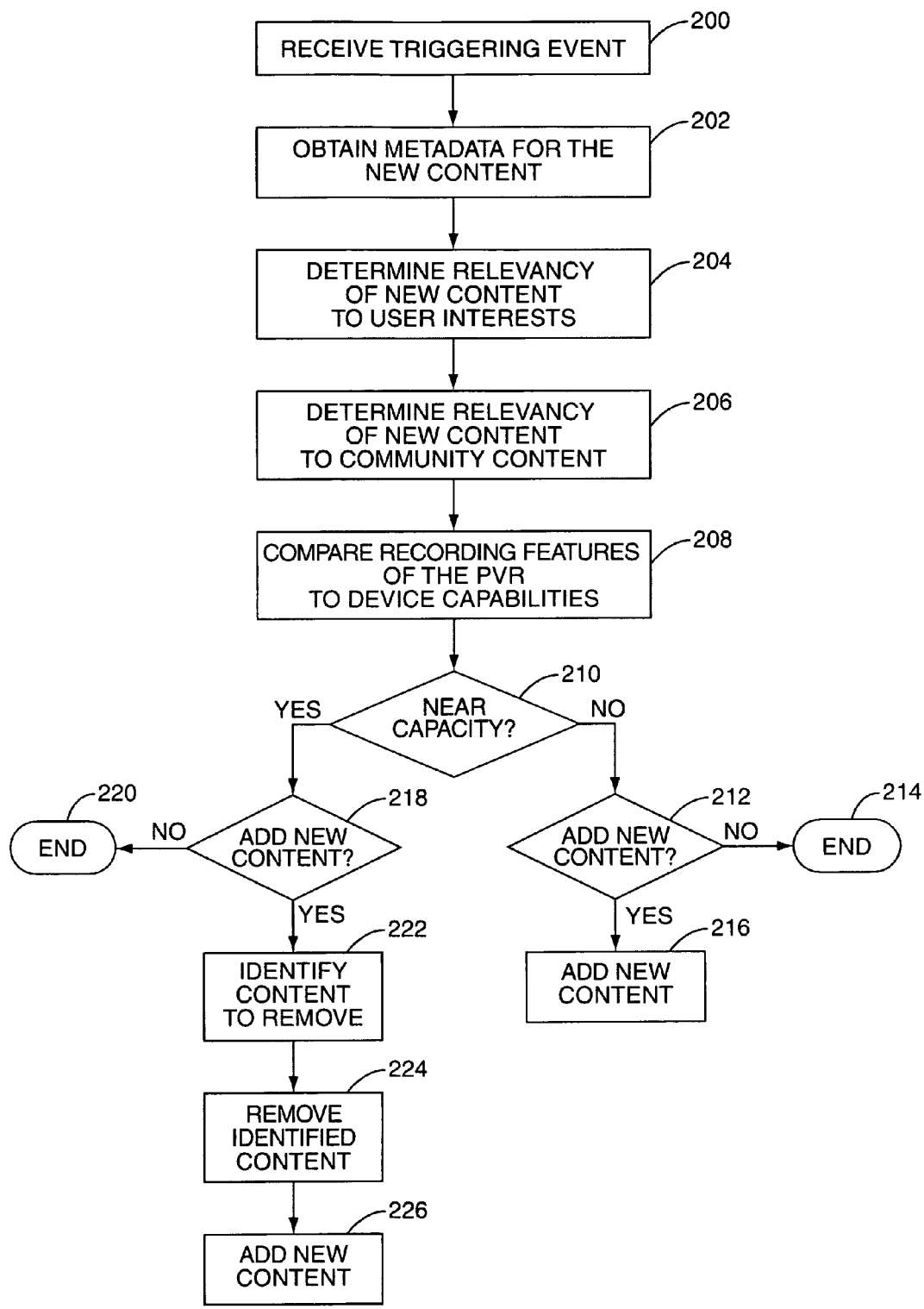
FIG. 5 is a flow chart illustrating the operation of the master content agent to determine whether to add new content to the collective community space according to one embodiment of the present invention.

FIG. 5 is a flow chart illustrating the operation of the master content agent 30 to manage content stored in the collective community space of the PVRs 14, 16 and the playback devices 24, 26 according to one embodiment of the present invention. The master content agent 30 manages the collective community space as a fluid and dynamic process. First, the master content agent 30 receives a triggering event (step 200). The triggering event may be a recording event from one of the PVRs 14, 16, a new content event, an idle event from one of the PVRs 14, 16, or a content injection request from the third-party server 28.

First, the process of FIG. 5 will be discussed with respect to a recording event. A recording event may be sent when, for example, the user of the PVR 14 instructs the PVR 14 to record specified content, which is hereafter referred to as new content. The following discussion is equally applicable to a new content event, which may be sent when, for example, the PVR 14, or optionally the playback device 24, has access to new content via a VOD service or the network 18. Once the recording event is received, the master content agent 30 obtains metadata for the new content associated with the recording event (step 202). In one embodiment, the metadata for the new content is first obtained by the client content agents 36, 52 from, for example, an EPG and then provided to the master content agent 30 as part of the recording event. As such, the master content agent 30 may obtain the metadata for the new content from the recording event. In addition or alternatively, the recording event may include information identifying the new content, and the master content agent 30 may obtain metadata, or additional metadata, for the new content from either an internal or associated database or a third-party server.

The master content agent 30 may then determine the relevancy of the new content to user interests based on the metadata for the new content and the user interest model (step 204). More specifically, in one embodiment, the metadata for the new content is first used to score the content ontology. The scored nodes for the new content are then compared to the user interest model to determine the relevancy of the new content to user interest.

For example, an episode of Firefly may have the following scores for the nodes of the content ontology:

| | |
|---|---|
| Science Fiction: | 350 |
| Rutger Hauer: | 200 |
| Star Trek: | 150 |

Further, for this example, the user interest model may have the following scores for the nodes of the content ontology:

| | |
|---|---|
| Drama: | 15000 |
| Fantasy: | 23000 |
| Lord of the Rings: | 10000 |
| Harry Potter: | 15000 |
| Science Fiction: | 5300 |

Thus, the user interest model shows a high level of user interest in "Fantasy," but does have some overlap with the new content's scored nodes. In one embodiment, the master content agent 30 compares the new content's scored nodes to the user interest model by adjusting the scores of the new content's scored nodes based on the distance and weights associated with the relationships between the nodes in the content ontology. Given the above examples, the adjusted scores, which are referred to as user interest scores, for the new content are:

| | |
|---|---|
| Science Fiction: | 350 |
| Rutger Hauer: | 180 |
| Star Trek: | 165 |

The score for "Science Fiction" is left unchanged since it has a distance of zero from the nearest scored node in the user interest model. The "Rutger Hauer" node is closest to the "Science Fiction" node, and the weight of the relationship between the "Rutger Hauer" node and the "Science Fiction" node is, in this example, 0.9. As such, the weighted score for the "Rutger Hauer" node is 180. The "Star Trek" node is closest to the "Science Fiction" node, and the weight of the relationship between the "Star Trek" node and the "Science Fiction" node is, in this example, 1.1. As such, the weighted score for the "Star Trek" node is 165.

In addition, the scores may optionally be further adjusted based on relative user interest. For example, the relative user interest in "Science Fiction" may be:

$$\frac{5300}{15000 + 23000 + 10000 + 15000 + 5300} \times 100 \cong 8.$$

As such, the "Science Fiction," "Rutger Hauer," and "Star Trek" nodes may have the further adjusted scores of 2800, 1440, and 1320.

Still further, if the user associated with the recording event is a preferred user, the scores may be further adjusted to give additional weight to the new content.

Once the user interest scores for the new content are determined, the user interest scores for the various nodes may be combined to form a combined user interest score for the new content. As discussed below, the combined user interest scores and/or the user interest scores for the various nodes may be used to determine whether the new content is to be added to the collective community space.

In a similar fashion, the master content agent 30 may determine the relevancy of the new content to the content already stored in the collective community space based on the metadata for the new content and the community content model (step 206). More specifically, in one embodiment, the metadata for the new content is first used to score the content ontology. Since scoring the nodes of the content ontology based on the metadata for the new content has already occurred in step 204, this may be redundant, and therefore unnecessary. However, it may be necessary in the situation where step 204 is performed after determining the relevancy of the new content to the community content or if step 204 is not performed at all. The scored nodes for the new content are then compared to the community content model to determine the relevancy of the new content to content already stored in the collective community space. The details of the comparison are as described above with respect to step 204 where the user interest model is replaced with the community content model. As a result, a combined community content score and/or adjusted community content scores for the new content may be provided and thereafter used to determine whether to add the new content to the collective community space.

It should be noted that while the preferred embodiment uses both steps 204 and 206, the present invention is not limited thereto. The master content agent 30 may alternatively perform only step 204 or only step 206 and determine whether to add the new content to the collective community space based on the relevancy of the new content to user interests, the relevancy of the new content to the content already stored in the collective community space, or both the relevancy of the new content to user interests and the relevancy of the new content to the content already stored in the collective community space. Alternatively, the user interest model and the community content model may be combined into a single model. However, in the preferred embodiment discussed herein, separate and distinct community content and user interest models are used to allow for loose coupling between what the community finds interesting versus what content is actually stored in the collective community space. User interest may rapidly fluctuate, however, the content capture capabilities of the network may not be able to adjust to the changes in user interests as quickly as they are occurring. By factoring in the community content model, this issue is alleviated. In addition, it may be desirable to change the content stored in the collective community space at a slower rate than user interests to avoid thrashing due to wild swings in user interests.

Optionally, the master content agent 30 may compare the recording features of the PVR 14 where the recording event originated to the device capabilities model (step 208). By doing so, the master content agent 30 may determine whether the recording features of the PVR 14 are compatible with the other PVRs 16 and the playback devices 24, 26 in the community. For example, if the PVR 14 only records in high-definition and very few of the other devices 16, 24, 26 are capable of playing high-definition content, then, as discussed below, the new content may not be added to the community space. More specifically, in one embodiment, the device capabilities of the PVR 14 are used to score the nodes of the device capabilities ontology. Those scores are then compared to the device capabilities model in a manner similar to that described above with respect to steps 204 and 206 to generate adjusted scores for the nodes of the device capabilities model and a combined device capabilities score for the PVR 14.

Steps 210-226 illustrate an exemplary process implemented by the master content agent 30 for determining whether to add the new content to the collective community space. First, the master content agent 30 determines whether the collective community space is near capacity (step 210). For example, the master content agent 30 may determine a percentage of the collective community space that is currently used. If that percentage is above a predetermined threshold such as, for example, 75%, then the master content agent 30 determines that the collective community space is near capacity. Note that the master content agent 30 may additionally or alternatively determine whether the community space 42 of the PVR 14 is near capacity.

If the collective community space is not near capacity, the master content agent 30 then determines whether to add the new content to the collective community space (step 212). As discussed above, the master content agent 30 may determine whether to add the new content to the collective community space based on the relevancy of the new content to user interests, the relevancy of the new content to the content already stored in the collective community space, or both the relevancy of the new content to user interests and the relevancy of the new content to the content already stored in the collective community space. In addition, the master content agent 30 may consider the compatibility of the recording features of the PVR 14 with the playback capabilities of the other devices 16, 24, 26 in the community.

For example, the master content agent 30 may first determine whether the recording features of the PVR 14 are compatible with the playback features of the other devices 16, 24, 26. This may be done by comparing the combined device capabilities score of step 208 to a predetermined threshold. If the score is below the threshold, then the new content is not added to the community space and the process ends (step 214). If the score is above the threshold, the master content agent 30 then determines whether the combined user interest score provided by step 204 and/or the combined community content score provided by step 206 are above corresponding predetermined thresholds. If not, the new content is not added and the process ends (step 214). Otherwise, the new content is added to the collective community space (step 216).

When adding the new content to the collective community space, the new content may be moved to the community space 42 of the PVR 14 recording the content. Thereafter, the new content may be distributed throughout the community as it is used, or consumed, by other devices in the community. In addition or alternatively, the master content agent 30 may effect copying of the new content to one or more additional devices such as, for example, the playback device 26 associated with another user. The new content may be copied to additional devices in order to make the new content readily available to the community. The master content agent 30 may effect replication of the new content throughout the devices 14, 16, 24, 26 in the community based on the user interest model, the community content model, the device capabilities model, or any combination thereof.

In one embodiment, the new content may be randomly distributed, or copied, throughout the network. The new content may be copied, or replicated, throughout the network based on, for example, the user interest model and the community content model. In a second embodiment, the master content agent 30 may identify geographic areas where the new content is most relevant to the user interests or community content already stored in that area, and then copies the new content to one or more devices in that geographic area. In a third embodiment, the master content agent 30 may identify the user to whom the new content is most relevant and effect copying to at least a portion of those users. In a fourth embodiment, the master content agent 30 may distribute the new content among the PVRs 14, 16 and the playback devices 24, 26 in a manner similar to that used by OceanStore or other distributed file systems. For more information regarding OceanStore, the interested reader may contact the UC Berkeley Computer Science Division for more information regarding OceanStore. OceanStore and other distributed file systems use content replicas to ensure high availability and survivability of content.

Returning to step 210, if the collective community space is near capacity, the master content agent 30 determines whether the new content is to be added to the collective space (step 218). As discussed above with respect to step 212, the master content agent 30 may determine whether to add the new content to the collective community space based on the relevancy of the new content to user interests, the relevancy of the new content to the content already stored in the collective community space, or both the relevancy of the new content to user interests and the relevancy of the new content to the content already stored in the collective community space. The master content agent 30 may also consider the compatibility of the recording features of the PVR 14 with the playback capabilities of the other devices 16, 24, 26 in the community. If the new content is not to be added, the process ends (step 220). If the new content is to be added, the process proceeds to step 222.

More specifically, because the collective community space is near capacity, the master content agent 30 determines whether the new content is to be added to the collective community space, and, if the new content is to be added, what content is to be removed from the community space. Thus, in one embodiment, the master content agent 30 scores the content already stored in the collective community space using the user interest model and/or the community content model as was done for the new content in steps 204 and 206. Note that the scores for the content may be persisted, or stored, and updated only when desired. In order to decide whether to add the new content, the master content agent 30 may consider the scores of the new content, the scores of the content already stored in the collective community space, and optionally one or more additional factors such as, for example, original broadcast date, running time of the content, language, ratings, whether the content is or is not a re-run, whether the content does or does not have commercials, whether the language or scene filters have been applied to the content (edited versus non-edited versions), the source of the content, recording quality, the amount of time the content has been stored in the collective community space, the number of times the content has been viewed by users in the community, the number of requests from users to keep the content in the collective community space, content size, and the like.

For example, after scoring, the new content and the content already stored in the collective community space may be represented by the following table.

| Name | Combined User Interest Model Score | Combined Content Model Score | Combined Device Model Score | Date | Age | Views | Requests to Keep | Size |
|---|---|---|---|---|---|---|---|---|
| C1 | 5000 | 6000 | 5000 | 1999 | 10 days | 20 | 10 | 5G |
| C2 | 5500 | 6300 | 5000 | 2000 | 50 days | 200 | 5 | 6G |
| C3 | 4000 | 2500 | 6000 | 2006 | 3 days | 5 | 1 | 8G |
| C4 | 8000 | 4000 | 3000 | 2006 | 3 days | 3 | 2 | 2G |
| New | 5500 | 6300 | 5000 | 2000 | 0 | 0 | 0 | 5G |

In operation, the master content agent 30 may actually or conceptually maintain this table. The master content agent 30 may then decide whether to add the new content by sorting the above table. For example, the master content agent 30 may sort the above table first according to the combined user model score in descending order, then by the date published or originally broadcast in descending order, then by the age in the network in ascending order, then by the content model score in descending order, then by the number of views in descending order, then by the number of requests to keep the content in descending order, then by the size of the content in ascending order. As a result, the sorted table below may be actually or conceptually produced.

| Name | Combined User Interest Model Score | Combined Content Model Score | Combined Device Model Score | Date | Age | Views | Requests to Keep | Size |
|---|---|---|---|---|---|---|---|---|
| C4 | 8000 | 4000 | 3000 | 2006 | 3 days | 3 | 2 | 2G |
| New | 5500 | 6300 | 5000 | 2000 | 0 | 0 | 0 | 5G |

-continued

| Name | Combined User Interest Model Score | Combined Content Model Score | Combined Device Model Score | Date | Age | Views | Requests to Keep | Size |
|------|------|------|------|------|------|------|------|------|
| C2 | 5500 | 6300 | 5000 | 2000 | 50 days | 200 | 5 | 6G |
| C1 | 5000 | 6000 | 5000 | 1999 | 10 days | 20 | 10 | 5G |
| C3 | 4000 | 2500 | 6000 | 2006 | 3 days | 5 | 1 | 8G |

Since the new content (New) is not at the bottom of the sorted list, the master content agent 30 decides to add the new content to the collective community space.

Next, since the new content is to be added, the master content agent 30 then identifies the content to be removed from the collective community space (step 222). Using the example above, the content C3 is at the bottom of the sorted table, or list. As such, the content C3 is identified as the content to remove from the collective community space. Once identified, the content is removed from the collective community space (step 224). In one embodiment, the master content agent 30 instructs all devices storing the identified content to delete the content from their community spaces. In another embodiment, the master content agent 30 may notify all users in a subset of the users that the identified content is to be removed from the collective community space. The subset of the users may be those users who have either previously viewed the identified content or shown interest in the identified content by, for example, requesting that the content be kept in the collective community space The notified users may then copy the identified content to their personal space. At some point thereafter, the identified content is removed, or deleted, from the collective community space.

Either before, while, or after the identified content is removed from the collective community space, the master content agent 30 operates to add the new content to the collective community space (step 226). The master content agent 30 may add the new content to the collective community space by instructing the PVR 14 that has recorded or is recording the new content to move the new content to the community space 42 of the PVR 14. Thereafter, the new content may be replicated to other devices 16, 24, 26 as the users of those devices view the new content. In addition or alternatively, the master content agent 30 may automatically copy, or replicate, the new content on one or more of the devices 14, 16, 24, 26, as discussed above.

Returning to step 200, the triggering event may be a content injection request from the third-party server 28. The third-party server 28 may provide the injection request when the third-party server 28 desires to inject content into the collective community space. The content injection request may include metadata describing the associated new content. Additionally or alternatively, the master content agent 30 may obtain the metadata for the new content from an internal or associated database or from another third-party server. The content injection request may be processed as described above with respect to the recording event. As such, the details will not be repeated.

Again looking at step 200, the triggering event may be an idle event. An idle event may be provided by, for example, the PVR 14 when the PVR 14 is idle. The idle event may optionally be sent only when the PVR 14 determines based on, for example, a history of the PVR 14 and/or time of day that the PVR 14 is likely to be idle for at least a threshold amount of time. In the preferred embodiment, in response to an idle event, the master content agent 30 may synthesize a recording event for each television program, movie, or the like accessible to the PVR 14 at the time of receiving the idle event and optionally during a period of time that the PVR 14 is expected to be idle. Each of the recording events may then be processed by steps 202-208 as an individual recording event in the manner described above.

More specifically, in response to receiving the idle event, the master content agent 30 obtains metadata for all content accessible to the PVR 14 (step 202). Thus, for each channel accessible to the PVR 14, the master content agent 30 obtains metadata describing the content available on those channels during the idle time, which is hereafter referred to as new content. For each television show, movie, or the like, the relevancy of the new content to the user interest model and/or the community content model is determined (steps 204 and 206). The recording features of the PVR 14 may optionally be compared to the playback capabilities of the other devices 16, 24, 26 (step 208).

Steps 210-226 then determine what, if any, of the new content is to be added to the collective community space. First, the master content agent 30 determines whether the collective community space is near capacity (step 210). If the collective community space is not near capacity, the master content agent 30 then determines whether to add any of the new content to the collective community space (step 212).

As discussed above, the master content agent 30 may determine whether to add the new content to the collective community space based on the relevancy of the new content to user interests, the relevancy of the new content to the content already stored in the collective community space, or both the relevancy of the new content to user interests and the relevancy of the new content to the content already stored in the collective community space. The master content agent 30 may consider the compatibility of the recording features of the PVR 14 with the playback capabilities of the other devices 16, 24, 26 in the community. The master content agent 30 also considers the recording capabilities of the PVR 14. More specifically, if the PVR 14 can record only two simultaneous channels, then the master content agent 30 factors this into the decision.

For example, the master content agent 30 may first determine whether the recording features of the PVR 14 are compatible with the playback features of the other devices 16, 24, 26. This may be done by comparing the combined device capabilities score of step 208 to a predetermined threshold. If the combined device capabilities score is below the threshold, then the content is not added to the community space and the process ends (step 214). If the device capabilities score is above the threshold, the master content agent 30 then determines whether the combined user interest score provided by step 204 and/or the combined community content score provided by step 206 are above corresponding predetermined thresholds for each accessible television program, movie, or the like. If none of the scores for the new content are above the thresholds, the process ends (step 214). If only one television program, movie, or the like has scores above the thresholds, then that content is added to the collective community space (step 216). However, if, for example, the PVR 14 can record only two channels simultaneously and more than two simultaneous television programs, movies, or the like have scores above the thresholds, then the master content agent 30 may select the two having the highest scores and add them to the collective community space.

Returning to step 210, if the collective community space is near capacity, the master content agent 30 determines what, if any, of the new content is to be added to the collective space (step 218). As discussed above with respect to step 212, the master content agent 30 may determine whether to add the new content to the collective community space based on the relevancy of the new content to user interests, the relevancy of the new content to the content already stored in the collective community space, or both the relevancy of the new content to user interests and the relevancy of the new content to the content already stored in the collective community space. The master content agent 30 may also consider the compatibility of the recording features of the PVR 14 with the playback capabilities of the other devices 16, 24, 26 in the community. In addition, the master content agent 30 may consider the recording capabilities of the PVR 14. If none of the new content is to be added, the process ends (step 220). If new content is to be added, the process proceeds to step 222.

More specifically, because the collective community space is near capacity, the master content agent 30 determines what, if any, of the new content is to be added to the collective community space, and, if new content is to be added, what content is to be removed from the community space. Thus, in one embodiment, the master content agent 30 scores the content already stored in the collective community space using the user interest model and/or the community content model as was done for all of the new content available to the PVR 14 in steps 204 and 206. In a manner similar to that described above, in order to determine whether to add any of the new content accessible to the PVR 14, the master content agent 30 may then consider the scores of all of the new content, the scores of the content already stored in the collective community space, and optionally one or more additional factors such as, for example, original broadcast date, running time of the content, language, ratings, whether the content is or is not a re-run, whether the content does or does not have commercials, whether the language or scene filters have been applied to the content (edited versus non-edited versions), the source of the content, recording quality, the amount of time the content has been stored in the collective community space, the number of times the content has been viewed by users in the community, the number of requests from users to keep the content in the collective community space, content size, and the like.

For example, a sorted list of content may be generated including the content already stored in the collective community space and all of the new content accessible to the PVR 14. The table may be sorted based on the combined user interest model scores, the combined community content model scores, the combined device capabilities scores, and optionally one or more additional factors, as described above. Based on the sorted list and optionally the recording capabilities of the PVR 14, the master content agent 30 determines what, if any, of the new content accessible to the PVR 14 is to be recorded by the PVR 14 and added to the collective community space. In addition, the master content agent 30 may identify content to remove from the collective community space to make room for any new content added to the collective community space (step 222).

At this point, the content identified to be removed is removed from the collective community space (224). Further, any new content identified as content to be added to the collective community space is recorded by the PVR 14 and added to the collective community space (step 226).

Figure 6:
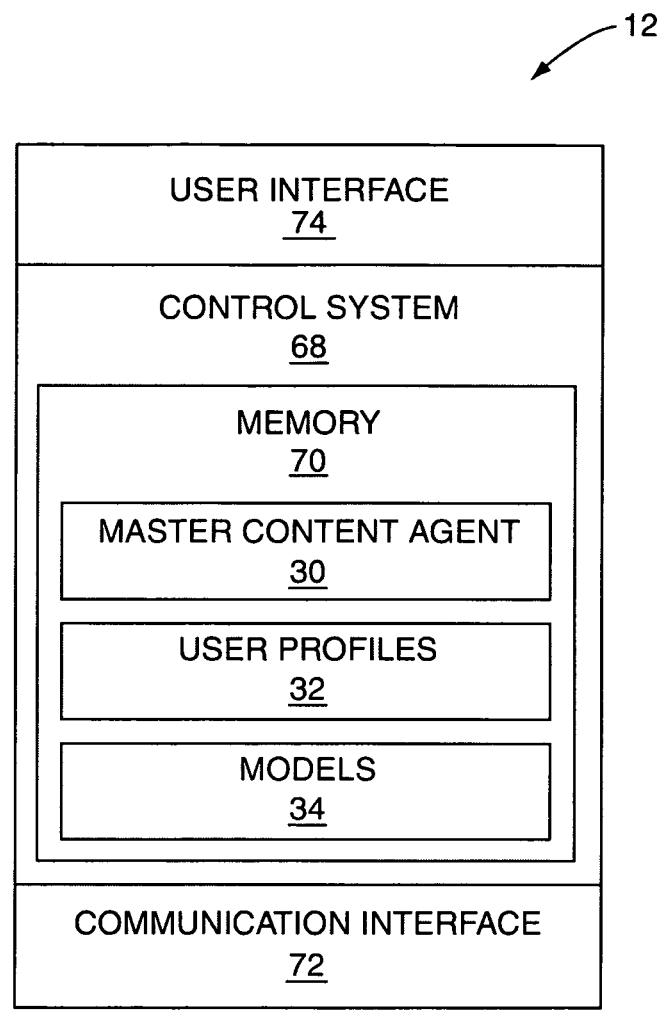
FIG. 6 is a block diagram of the PCMS server of FIG. 1 according to one embodiment of the present invention.

FIG. 6 is a block diagram of an exemplary embodiment of the PCMS server 12 according to one embodiment of the present invention. In general, the PCMS server 12 includes a control system 68 having associated memory 70. In this embodiment, the master content agent 30 is at least partially implemented in software and stored in the memory 70. However, the present invention is not limited thereto. The master content agent 30 may be implemented in software, hardware, or a combination thereof. In this example, the user profiles 32 and the models 34 are also stored in the memory 70. However, the user profiles 32, the models 34, or both the user profiles 32 and the models 34 may alternatively be wholly or partially stored in a separate digital storage unit such as, for example, a hard-disc drive, wholly or partially stored by one or more associated external storage units, or wholly or partially stored by one or more third-party servers. The PCMS server 12 also includes a communication interface 72 communicatively coupling the PCMS server 12 to the network 18 (FIG. 1). The PCMS server 12 may also include a user interface 74, which may include components such as, for example, a display, one or more user input devices, and the like.

Figure 7:
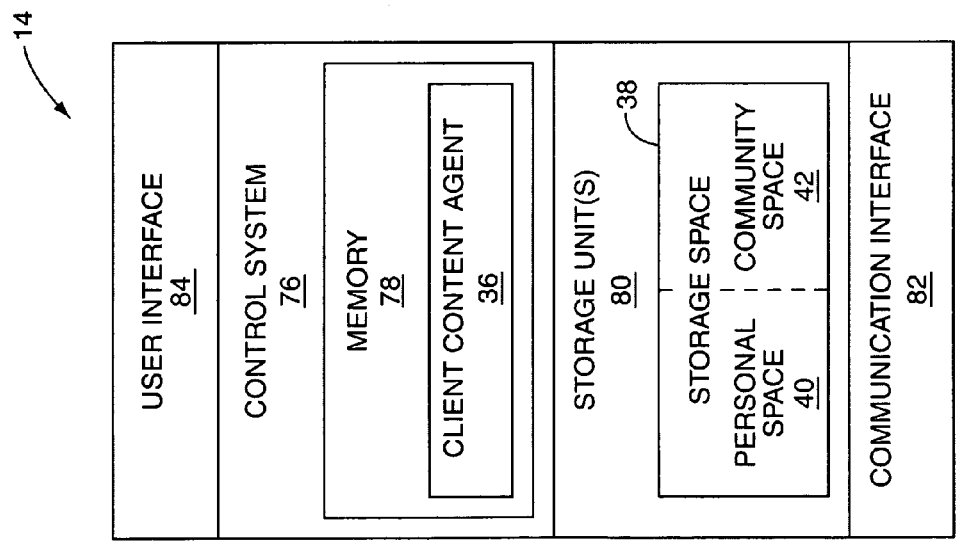
FIG. 7 is a block diagram of a PVR according to one embodiment of the present invention.

FIG. 7 is a block diagram of an exemplary embodiment of the PVR 14 according to one embodiment of the present invention. However, this discussion is equally applicable to the other PVRs in the system 10 such as the PVR 16. In general, the PVR 14 includes a control system 76 having associated memory 78. In this embodiment, the client content agent 36 is at least partially implemented in software and stored in the memory 78. However, the present invention is not limited thereto. The client content agent 36 may be implemented in software, hardware, or a combination thereof. As will be readily apparent to one of ordinary skill in the art, the control system 76 includes additional hardware and/or software providing traditional PVR functionality. The PVR 14 also includes one or more storage units 80, such as, for example, one or more hard-disc drives or the like. The storage units 80 provide the storage space 38 of the PVR 14, which is either physically or logically partitioned into the personal space 40 and the community space 42. The PVR 14 also includes a communication interface 82 communicatively coupling the PVR 14 to the network 18 (FIG. 1). The communication interface 82 also operates to couple the PVR 14 to a television service provider either via the network 18 or via a separate network such as, for example, a wired cable network or a satellite based network, as will be apparent to one of ordinary skill in the art. The PVR 14 may also include a user interface 84, which may include components such as, for example, a display, one or more user input devices, speakers, and the like. Alternatively, if the PVR 14 is implemented as a set-top box or a component of a set-top box, the communication interface 82 may also include an interface to an associated television or display wherein the PVR 14 presents content to an associated user via the associated television or display.

Figure 8:
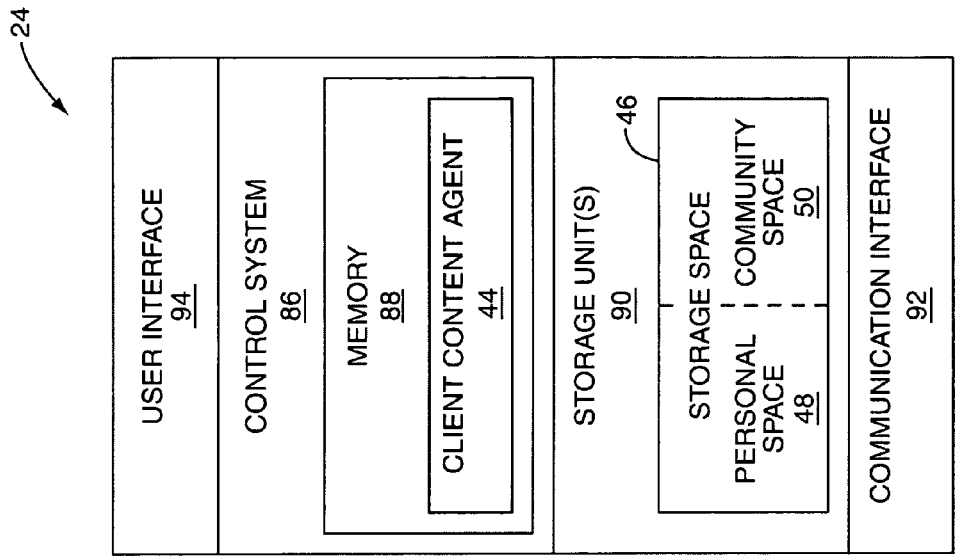
FIG. 8 is a block diagram of a playback device according to one embodiment of the present invention.

FIG. 8 is a block diagram of an exemplary embodiment of the playback device 24 according to one embodiment of the present invention. However, this discussion is equally applicable to the other playback devices in the system 10 such as the playback device 26. In general, the playback device 24 includes a control system 86 having associated memory 88. In this embodiment, the client content agent 44 is at least partially implemented in software and stored in the memory 88. However, the present invention is not limited thereto. The client content agent 44 may be implemented in software, hardware, or a combination thereof. As will be readily apparent to one of ordinary skill in the art, the control system 86 includes additional hardware and/or software providing traditional media playback functionality. The playback device 24 also includes one or more storage units 90, such as, for example, one or more hard-disc drives or the like. The storage units 90 provide the storage space 46 of the playback device 24, which is either physically or logically partitioned into the personal space 48 and the community space 50. The playback device 24 also includes a communication interface 92 communicatively coupling the playback device 24 to the network 18 (FIG. 1). The playback device 24 may also include a user interface 94, which may include components such as, for example, a display, one or more user input devices, speakers, and the like. Alternatively, the communication interface 82 may also include an interface to an associated television or display wherein the playback device 24 presents content to an associated user via the associated television or display.

The present invention provides substantial opportunity for variation without departing from the spirit or scope of the present invention. For example, while the master content agent 30 is discussed herein as controlling the collective community space of the PVRs 14, 16 and playback devices 24, 26 at separate user locations 20, 22, the present invention is not limited thereto. More specifically, the master content agent 30 may be hosted by a server in a local area network (LAN) and operate to manage the collective community space of one or more PVRs 14 and playback devices 24 at a single user location, where the PVRs 14 and the playback devices 24 are coupled to the master content agent 30 via the LAN, or alternatively P2P communication.

Those skilled in the art will recognize improvements and modifications to the preferred embodiments of the present invention. All such improvements and modifications are considered within the scope of the concepts disclosed herein and the claims that follow.

What is claimed is:

1. A method of managing a collective community space provided by a plurality of networked Personal Video Recorders (PVRs), wherein each PVR of the plurality of networked PVRs includes a storage space comprising a community space, where the collective community space includes the community space of each PVR, the method comprising, at a server:
   receiving a plurality of user interest events from the plurality of networked PVRs;
   generating a user interest model based on the plurality of user interest events;
   generating a community content model based on information describing media content stored in the collective community space;
   receiving notification that one of the plurality of networked PVRs has recorded content, wherein the content was recorded after generation of the user interest model;
   obtaining information describing the recorded content;
   determining whether to copy the recorded content from the one of the plurality of networked PVRs to the collective community space based on a comparison of the information describing the recorded content to one or both of the user interest model and the community content model, wherein the determination is made in response to the content being recorded on one of the plurality of networked PVRs; and
   instructing, based on the determination, the one of the plurality of networked PVRs to copy the recorded content to a community space of one or more additional PVRs of the plurality of networked PVRs, in order to copy the recorded content to the collective community space.

2. The method of claim 1 further comprising instructing the one of the plurality of networked PVRs to add the recorded content to the community space of the one of the plurality of networked PVRs.

3. The method of claim 2 further comprising effecting distribution of the recorded content to at least one additional one of the plurality of networked PVRs.

4. The method of claim 2 further comprising effecting distribution of the recorded content to a community space of at least one playback device other than the plurality of networked PVRs.

5. The method of claim 1 further comprising:
   identifying at least one of the plurality of networked PVRs to which the recorded content is to be added; and
   effecting copying of the recorded content to the at least one of the plurality of networked PVRs.

6. The method of claim 1 further comprising:
   identifying at least one device from the plurality of networked PVRs and a plurality of playback devices to which the recorded content is to be added; and
   effecting copying of the recorded content to the at least one device.

7. The method of claim 1 wherein for each one of the plurality of networked PVRs, receiving the plurality of user interest events comprises receiving at least one of a group consisting of: information identifying content scheduled to be recorded by the one of the plurality of networked PVRs; information identifying content watched by a user of the one of the plurality of networked PVRs but not recorded; information identifying actions taken by the user while watching particular content; and information identifying how long the user watches particular content.

8. The method of claim 1 wherein each of the plurality of user interest events is associated with media content and generating the user interest model comprises generating the user interest model based on information describing the media content associated with each of the plurality of user interest events.

9. The method of claim 8 wherein generating the user interest model further comprises providing additional weight to user interest events associated with a particular user.

10. The method of claim 1 wherein each of the plurality of user interest events is associated with media content and generating the user interest model comprises:
    scoring nodes of a content ontology based on information describing the media content for each of the plurality of user interest events; and
    combining the scores of the nodes of the content ontology for the plurality of user interest events to provide the user interest model.

11. The method of claim 1 further comprising obtaining information describing the recorded content, wherein determining whether to copy the recorded content to the collective community space comprises:
    scoring nodes of a content ontology based on the information describing the recorded content;
    comparing the scored nodes of the content ontology to the user interest model; and
    determining whether to copy the recorded content to the collective community space based on the comparison.

12. The method of claim 1 further comprising obtaining information describing the recorded content, wherein determining whether to copy the recorded content to the collective community space comprises:
    scoring nodes of a content ontology based on the information describing the recorded content;
    comparing the scored nodes of the content ontology to the user interest model;
    comparing the scored nodes of the content ontology to the community content model; and determining whether to copy the recorded content to the collective community space based on the comparisons.

13. The method of claim 1 wherein the media content stored by the collective community space comprises a plurality of media content units and generating the community content model comprises:
   for each media content unit of the plurality of media content units, scoring nodes of a content ontology based on information describing the media content unit; and
   combining the scores of the nodes of the content ontology for the plurality of media content units to provide the community content model.

14. The method of claim 1 wherein determining whether to copy the recorded content to the collective community space comprises determining whether to copy the recorded content to the collective community space based on the user interest model and device capabilities of each of the plurality of networked PVRs.

15. The method of claim 1 wherein generating the community content model further comprises providing additional weight to a portion of the media content stored in the community space of one of the plurality of networked PVRs associated with a particular user.

16. The method of claim 1 further comprising obtaining information describing the recorded content, wherein determining whether to copy the recorded content to the collective community space comprises:
   scoring nodes of a content ontology based on the information describing the recorded content;
   comparing the scored nodes of the content ontology to the community content model; and
   determining whether to copy the recorded content to the collective community space based on the comparison.

17. The method of claim 1 wherein determining whether to copy the recorded content to the collective community space comprises determining whether to copy the recorded content to the collective community space based on the community content model and device capabilities of each of the plurality of networked PVRs.

18. The method of claim 1, wherein the storage space of each PVR of the plurality of networked PVRs further comprises a personal space separate from the community space, where the recorded content is added to the community space of each PVR.

19. A server for managing a collective community space provided by a plurality of networked Personal Video Recorders (PVRs), wherein each PVR of the plurality of networked PVRs includes a storage space comprising a community space, where the collective community space includes the community space of each PVR, the server comprising:
   memory;
   a communication interface communicatively coupling the server to the plurality of networked PVRs via a network; and
   a control system associated with the memory and the communication interface and configured to:
   receive a plurality of user interest events from the plurality of networked PVRs;
   generate a user interest model based on the plurality of user interest events;
   generate a community content model based on information describing media content stored in the collective community space;
   receive notification that one of the plurality of networked PVRs has recorded content, wherein the content was recorded after generation of the user interest model;
   obtain information describing the recorded content;
   determine whether to copy the recorded content from the one of the plurality of networked PVRs to the collective community space based on a comparison of the information describing the recorded content to one or both of the user interest model and the community content model, wherein the determination is made in response to the content being recorded on one of the plurality of networked PVRs; and
   instruct, based on the determination, the one of the plurality of networked PVRs to copy the recorded content to a community space of one or more additional PVRs of the plurality of networked PVRs, in order to copy the recorded content to the collective community space.

20. The server of claim 19 wherein each of the plurality of user interest events is associated with media content and the control system is further configured to generate the user interest model based on information describing the media content associated with each of the plurality of user interest events.

21. The server of claim 19 wherein the media content stored by the collective community space comprises a plurality of media content units and, in order to generate the community content model, the control system is further configured to:
   for each media content unit of the plurality of media content units, score nodes of a content ontology based on information describing the media content unit; and
   combine the scores of the nodes of the content ontology for the plurality of media content units to provide the community content model.

\* \* \* \* \*